(12) United States Patent
Beute

(10) Patent No.: US 8,433,537 B2
(45) Date of Patent: Apr. 30, 2013

(54) IDENTIFYING MOBILE DEVICES

(75) Inventor: Berco Beute, Groningen (NL)

(73) Assignee: Nederlandse Organisatie Voor Toegepast-Natuurwetenschappelijk Onderzoek Tno (NL)

( * ) Notice: Subject to any disclaimer, the term of this patent is extended or adjusted under 35 U.S.C. 154(b) by 361 days.

(21) Appl. No.: 12/676,714

(22) PCT Filed: Sep. 5, 2008

(86) PCT No.: PCT/NL2008/050591
§ 371 (c)(1),
(2), (4) Date: Sep. 16, 2010

(87) PCT Pub. No.: WO2009/031899
PCT Pub. Date: Mar. 12, 2009

(65) Prior Publication Data
US 2011/0004436 A1 Jan. 6, 2011

(30) Foreign Application Priority Data
Sep. 7, 2007 (EP) ..................................... 07115882

(51) Int. Cl.
*G06F 15/00* (2006.01)
*H04W 24/00* (2009.01)

(52) U.S. Cl.
USPC ....................................... 702/141; 455/456.1

(58) Field of Classification Search .................. 702/141; 455/556.1, 456.1; 340/537; 345/156, 158
See application file for complete search history.

(56) References Cited

U.S. PATENT DOCUMENTS

| 2005/0198029 A1 | 9/2005 | Pohja et al. |
| 2005/0212753 A1 | 9/2005 | Marvit et al. |
| 2005/0212760 A1 | 9/2005 | Marvit et al. |
| 2006/0242434 A1 | 10/2006 | Lee |
| 2006/0256074 A1 | 11/2006 | Krum et al. |

(Continued)

FOREIGN PATENT DOCUMENTS

| GB | 2 447 674 A | 9/2008 |
| WO | WO 2004/075169 | 9/2004 |
| WO | WO 2009/031899 A1 | 3/2009 |

OTHER PUBLICATIONS

Darko Kirovski et al: "The Martini Synch: Device Pairing via Joint Quantization" Information Theory, 2007. ISIT 2007. IEEE International Symposium on, IEEE Piscataway, NJ, USA: Jun. 24, 2007, pp. 466-470, XP031440761.

(Continued)

*Primary Examiner* — Bryan Bui
(74) *Attorney, Agent, or Firm* — DLA Piper US LLP; Jennifer E. Lacroix, Esq.

(57) ABSTRACT

A method of identifying mobile devices (1,1') capable of communicating (C) with each other comprises the steps of deriving, for each mobile device, movement information from movements (M) made by the mobile device within a respective time period, and communicating the movement information. The method comprises the further steps of comparing the movement information of the mobile device (1) with the movement information of at least one other mobile device (T), and identifying mobile devices having matching movement information. The step of deriving movement information is carried out using sensors mounted in the mobile device, such as acceleration sensors and/or optical sensors. The step of comparing the movement information may be carried in a mobile device (1) or in a central unit.

16 Claims, 3 Drawing Sheets

U.S. PATENT DOCUMENTS

2007/0115344 A1 5/2007 Park et al.
2007/0176898 A1* 8/2007 Suh .............................. 345/158
2007/0211573 A1 9/2007 Hermansson
2007/0270222 A1 11/2007 Yamanaka et al.
2008/0019514 A1 1/2008 Stromberg et al.

OTHER PUBLICATIONS

European Search Report, Application No. EP 09 154358, Oct. 12, 2009.

* cited by examiner

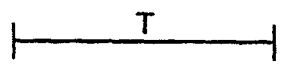
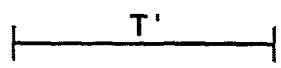
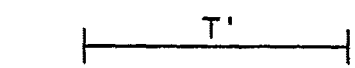
FIG. 4a          FIG. 4b
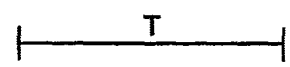
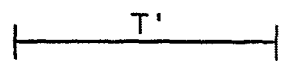
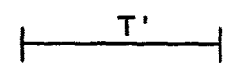
FIG. 4c          FIG. 4d
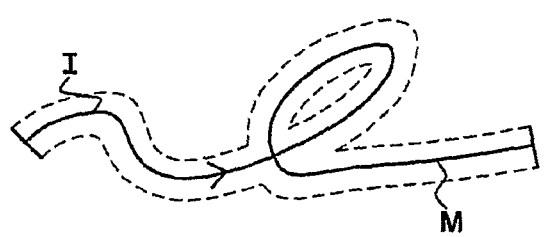
FIG. 5

IDENTIFYING MOBILE DEVICES

FIELD OF THE INVENTION

The present invention relates to identifying mobile devices. More in particular, the present invention relates to a method of identifying mobile devices on the basis of their movements, a mobile device for use in such a method, and a mobile communication system in which such a method is utilized.

DESCRIPTION OF RELATED ART

It is often desired to identify devices having a certain property, such as proximity to an object or a location, or mutual proximity. Other properties than proximity may be used to determine whether the devices, and hence their users, may have a common interest and/or need to be alerted to each other's presence. Such an other property may be motion: if two mobile devices describe a common or similar movement, their owners could be involved in the same activity, and/or could be in close proximity.

It is known to use the motion of mobile devices for initiating transactions. United States Patent Application US2006/256074 discloses an information exchange system that allows users of portable devices to initiate exchanges of information by using gestures. The detection of a gesture may cause a host device to perform a number of actions. The gestures are predetermined and so-called motion signatures defining the gestures are stored in a database. Detected motion patterns are compared with pre-specified motion signatures stored in the database. Accordingly, the user has to learn, the allowable gestures and their meanings before being able to use this Prior Art system. It is not possible to use any new gestures in this known system, as all allowable gestures have to be previously stored.

United States Patent Application US2005/212753 discloses a gesture based user interface which supports pre-existing symbols. A gesture database maintains a plurality of gestures, each gesture being defined by a motion of the device. The gestures comprise symbol gestures, each corresponding to a character from a pre-existing character set. Tracked movement of a handheld device is compared with the stored symbol gestures to identify a matching symbol gesture. This known system therefore also uses predetermined gestures.

United States Patent Application US2005/212760 discloses a motion controlled remote controller which also uses a gesture mapping database and matches tracked movements with predetermined remote command gestures. This known controller therefore has the same disadvantages as the Prior Art systems discussed above.

It is an object of the present invention to overcome these and other problems of the Prior Art and to provide a method of identifying mobile devices which is more flexible.

It is another object of the present invention to provide a system for mobile communication which embodies a more flexible method of identifying mobile devices which is more flexible, as well as a mobile device and an identification server for use in such a system.

SUMMARY OF THE INVENTION

Accordingly, the present invention provides a method of identifying mobile devices capable of communicating with each other, the method comprising the steps of deriving, for each mobile device, movement information from movements made by the mobile device within a respective time period, and communicating the movement information, which method is characterised by the steps of comparing the movement information of the mobile device with the movement information of at least one other mobile device, and identifying mobile devices having matching movement information.

By comparing the movement information of the mobile device with the movement information of another mobile device, instead of with stored movement information, a much more flexible method is obtained. That is, the movement made by a mobile device has to match the movement made by another device, but all movements can be arbitrary and need not comply with a predetermined pattern.

Mobile devices having matching movement information are identified as such and may be sent an identification message. Identification messages may be used to alert mobile devices (and optionally also other devices) to the fact that they performed a matching movement. As will be explained below, matching movements are not necessarily identical.

The method of the present invention may be carried out using only two mobile devices, but can also be carried, out using a plurality of mobile devices, for example, three, four, six, ten, twenty or even more mobile devices.

The term mobile device is meant to include handheld devices, portable devices and other devices which can be moved and, in particular, carried by a user. The term mobile device is further meant to include, but not be limited to, mobile telephone devices (also known as cellular telephone devices), PDAs (Personal Digital Assistants), laptop computers, MP3 players, watches, electronic car key devices, etc.

In a preferred embodiment, the step of comparing may involve searching for movement information associated with substantially identical movements. It is noted that the term substantially identical is meant to include both fully identical and almost identical, that is, identical with a certain margin of error, which margin of error is preferably predetermined.

In other embodiment, however, the step of comparing may involve searching for movement information associated with movements which substantially are each other's mirror images. That is, the movement information of one of the mobile devices is "mirrored" before being compared with the movement information of another mobile device. Accordingly, movements which are each other's mirror image can also be called "matching", even though they are not identical. Instead of mirror imaging, other transformations can be used, such as extension or compression. In general, matching movements may have a different orientation but still be "similar" enough to produce a match.

During the step of deriving movement information the at least two mobile devices may be held together. By holding the mobile devices together, an almost perfect match of the movement information may be obtained. However, the mobile devices may also be spaced apart during the movement(s). The mutual spacing of the mobile devices may vary from a few centimeters to a few kilometers or more.

The at least one movement may be a random movement, chosen by the users. The method of the present invention pins no constraints on the gestures used. The users are therefore also free to use any existing movements, such as writing an X in the air. In the method of the present invention, movements are not stored in a database for later comparison. Accordingly, the users can add movements freely.

In a preferred embodiment, the respective time periods in which movements are made and detected by the mobile device are identical. That is, the time periods in which the mobile devices detect movement and derive movement information start and stop at (approximately) the same moment in time. These time periods may be initiated by the movement itself, by pressing a button, by an external signal and/or by another trigger. Similarly, these time periods may also be ended by the movement itself (e.g. an absence of movement), by a special stop movement, by pressing a button, by an external signal and/or by another trigger.

If the time periods in which movements are made by the mobile devices are identical, they overlap completely. Alternatively, the respective time periods may start and stop at different moments in time and have only partial overlap, or have no overlap at all. In such cases, a time transformation is required to align the movements in time. This can easily be accomplished by means of a buffer unit or memory unit for temporarily storing (part or all of) the movement information of at least one of the devices.

It is preferred that the step of deriving movement information is carried out using sensors mounted in the mobile device, such as acceleration sensors and/or optical sensors. Acceleration sensors preferably measure the acceleration of the mobile device in three dimensions so as to be able to provide three-dimensional movement information. Optical sensors, which may be constituted by cameras, may also be mounted in the mobile devices, and may use reference points to determine the characteristics of the movements. Alternatively, or additionally, optical sensors may be mounted on other, stationary devices to register the movements of the mobile devices and derive movement information. Other sensors which may be mounted in the mobile devices include gyroscopes (preferably having three axes in order to cover three dimensions) and compasses.

In some embodiments, the step of communicating the movement information involves transmitting the movement information to another mobile device and carrying out the step of comparing the movement information in the other mobile device. That is the mobile devices are configured for comparing the movement information and identifying mobile devices having matching movement information. In other embodiments, however, the mobile devices transmit the movement information to a central server configured for comparing the movement information and identifying mobile devices having matching movement information.

The present invention also provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

The present invention further provides a mobile device capable of communicating with other mobile devices, the mobile device comprising:
movement sensors for deriving movement information from movements made by the mobile device within a respective time period, and
a communication unit for communicating the movement information,
which device is characterised by:
a comparison unit for comparing the movement information of the mobile device with the movement information of at least one other mobile device, and
an identification unit for identifying mobile devices having matching movement information.

The mobile device of the present invention allows the method of the present invention to be carried out effectively. The mobile device may further comprising a buffer unit for temporarily storing movement information. The temporarily stored movement information may be produced by the mobile device itself, for later comparison with the movement information from other mobile devices, and/or by other mobile devices, for later comparison with the movement information of the mobile device in question.

The present invention still further provides a system for mobile communication, the system comprising at least two mobile device as defined above. The present invention additionally provides an identification server for use in the method defined above and/or in the system defined above.

BRIEF DESCRIPTION OF THE DRAWINGS

The present invention will further be explained below with reference to exemplary embodiments illustrated in the accompanying drawings, in which:

FIGS. 3a-3e schematically show various embodiments of a mobile device according to the present invention.

FIG. 4a-4d schematically show various overlapping time periods in which movements of mobile devices may take place.

FIG. 5 schematically shows an example of an interval within which movements can be said to be substantially identical.

DETAILED DESCRIPTION

Figure 1:
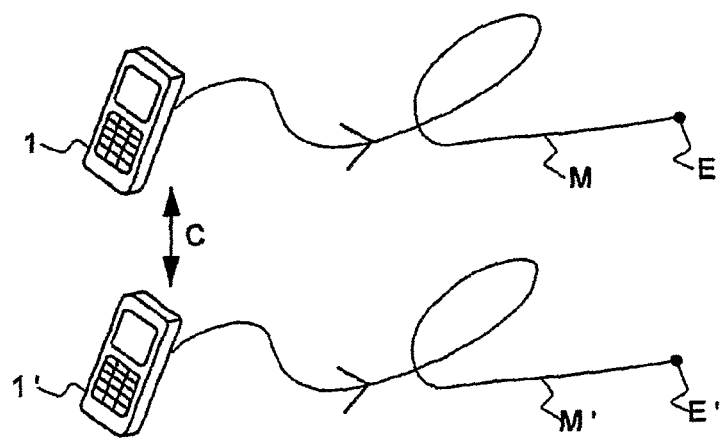
FIG. 1 schematically shows an example of the movement of two mobile devices.

The mobile devices or appliances 1 and 1' shown merely by way of non limiting example in FIG. 1 are mobile (or cellular) telephone devices capable of communicating wirelessly. The first mobile device 1 performs a movement M. This movement may be caused by the user of the mobile device 1, for example by moving her hand, by throwing the mobile device, or by carrying the mobile device in a moving vehicle. The movement M has an end point E, which may defined by the point where the movement stops, and/or by the point where the time period, in which the movement is monitored ends.

Similarly, the second mobile device V carries out a movement M' having an end point E'. In FIG. 1, the movements M and M' are substantially identical, that is, they are identical save a possible small margin of error, as will later be explained in more detail with reference to FIG. 5.

Movement information is derived from the movements M and M' by sensors accommodated in the mobile devices and/or in other devices. The movement information, which is characteristic of each movement and allows movements to be compared, is communicated between the mobile devices and/or a further device.

The mobile devices 1 and 1' are capable of communicating with each other via a (preferably wireless) communication channel C. In FIG. 1, the communication channel C may comprise a Bluetooth® link. Alternatively, or additionally, the communication channel C may involve a network for mobile communication, as will later be explained in more detail with reference to FIG. 2. In some embodiments, the mobile devices 1 and may be constituted by walkie-talkies suitably provided with motion sensors.

The present invention seeks to identify mobile devices performing substantially the same movements. This identification may serve to link the devices, for instance by setting up a communication protocol between them or otherwise involving the devices in a common activity, such as a game. The communication protocol may involve a speech connection, text (SMS) messages, and/or email messages.

Matching similar movements provides an easy identification of mobile devices. By actively moving the devices in certain patterns or gestures, the users of the devices can easily establish links with other devices, in particular if their users are involved in the same activity.

Although only two mobile devices are shown in FIG. 1, it will be understood that the present invention is not so limited and that the number of mobile devices involved may be expanded to three, four, ten, twenty, fifty or even more.

Figure 2:
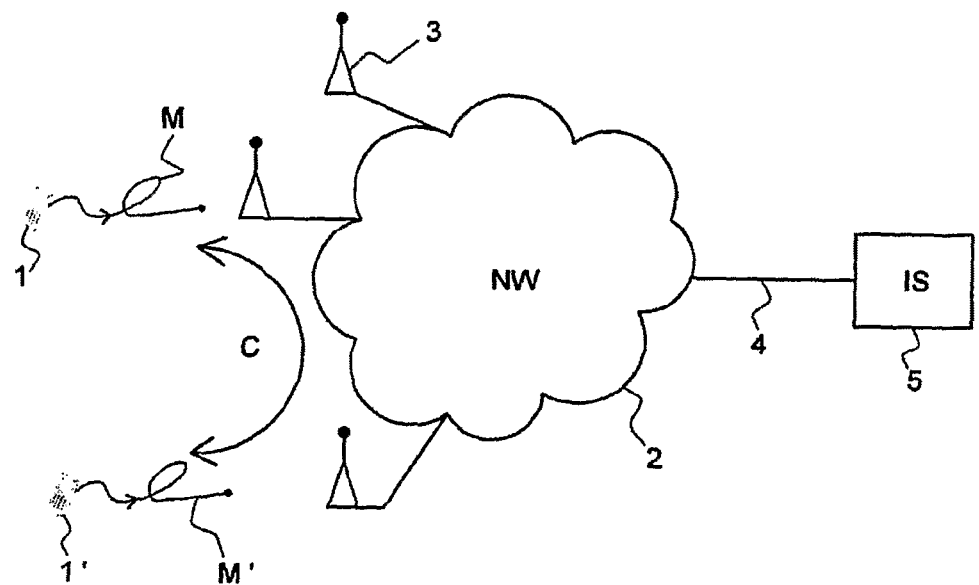
FIG. 2 schematically shows a communication system in which the present invention is utilized.

The communication system shown merely by way of non-limiting example in FIG. 2 comprises mobile devices 1 and 1', a network (NW) 2, antenna units 3, and an identification server (IS) 5 connected to the network 2 via a (wireless or cable) connection 4. It is noted that the identification server 5 may be omitted if the identification function is accommodated in the mobile devices 1 and 1'.

In the arrangement of FIG. 2, the mobile devices 1 and 1' are capable of communicating via the mobile network 2 (communication channel 2). As in the local communication channel of FIG. 1, the mobile network communication channel C of FIG. 2 allows the mobile devices to communicate with each other and exchange, for example, movement information defining their movements.

The identification server 5 serves to determine the identification of mobile devices making substantially the same (or at least matching) movements. The identification may involve a mobile telephone number, a SIM (Subscriber Identity Module) number, or any other suitable identification, which is sent to some (selected transmission) or all mobile devices (broadcast) to initiate an activity, such as (wireless) speech communication.

The movement information is transmitted as movement signals or movement messages, which may have the following format:

<start time stamp>; <movement parameters>; <stop time stamp>

That is, a movement message may contain a time stamp indicating the point in time at which the movement started (or, at least, the point in time at which the derivation of movement information started), movement parameters describing the movement in terms of accelerations and/or displacements, and a stop time stamp indicating the point in time at which the movement stopped (or, at least, the point in time at which the derivation of movement information stopped).

In the present invention, the mobile devices are preferably provided with sensors for deriving movement information. Alternatively, or additionally, external (possibly fixed) devices may be provided with optical sensors, such as cameras, for deriving movement information from the movements of the mobile devices. Using pattern recognition techniques, which may be known per re, the orientation of the mobile devices may be determined. However, it is preferred to utilize sensors which are accommodated in the mobile devices, and to derive movement information from the sensor signals (in some embodiments, the movement information may be identical to the sensor signals).

The sensors mounted in the mobile device are preferably acceleration sensors, which are known per se. Alternatively, or additionally, optical sensors may be used. The sensors are preferably configured for deriving three-dimensional movement information, regardless of the type of sensor. Thus, acceleration sensors configured for determining the acceleration in three dimensions are preferably used. Additionally, or alternatively, one or more gyroscopes may be mounted in a mobile device. If a single gyroscope is used, it preferably has three axes. A compass may be used to indicate an absolute direction.

Figure 3A:
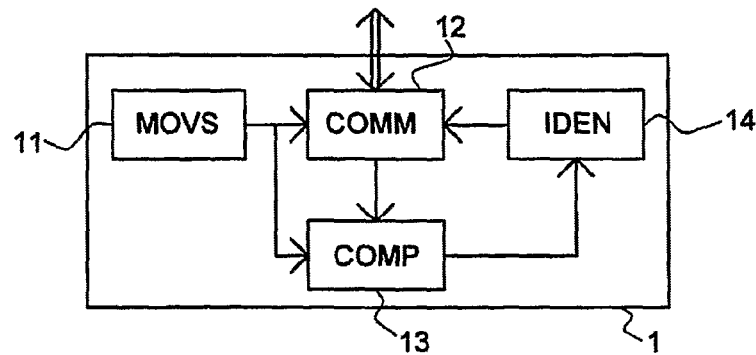
Figure 3B:
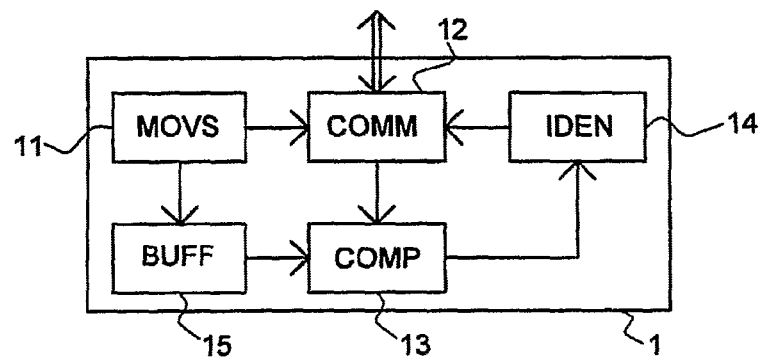
Figure 3C:
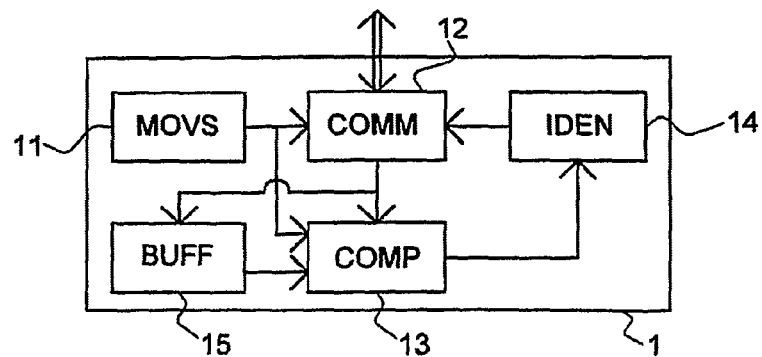

FIGS. 3a-3c show, by way of example, embodiments, of mobile devices according to the present invention. The mobile device 1 of FIG. 3a comprises a movement sensor (MOVS) unit 11, a communication (COMM) unit 12, a comparison (COMP) unit 13, and an identification (IDEN) unit 14. The communication unit 12 is arranged for sending and receiving information via a communication channel (C in FIGS. 1 and 2).

The movement sensor unit 11 derives movement information from the movement of the mobile device 1 and supplies this movement information to the communication unit 12, which in turn transmits the movement information to other mobile devices and/or to an external unit, such as the identification server 5 of FIG. 2.

The communication unit 12 receives movement information from other mobile devices, which received movement information is compared with the mobile device's own movement information in the comparison unit 13. If a match is detected, a match indication is sent to the identification unit 14, which determines the identification of the matching devices. It is noted that the match may involve more than two mobile devices, and that therefore more than two identifications may be determined.

The communication unit 12 transmits the identifications of the matching devices, in order to alert them to the match and trigger any subsequent activity, such as setting up a voice connection and/or starting a (common) game. The transmission may be a selective transmission to the identified devices only, or a broadcast.

In the embodiment of FIG. 3a, it is assumed that the movement information of the mobile device itself and the movement information of another mobile device are available substantially simultaneously, in the embodiment of FIG. 3b, a buffer (BUFF) unit 15 is provided for buffering the movement information of the mobile device 1 until the movement information from another mobile device has been received. In the embodiment of FIG. 3c, the buffer unit 15 is arranged for buffering received movement information until the movement information from the movement sensor unit 11 has been received. Those skilled in the art will readily be able to design embodiments in which the movement information from both sources may be buffered.

It is noted that buffer unit 15 serves to temporarily store movement information until the match can be made. The buffering may take between a few microseconds until a few minutes, perhaps a few hours, but there is no permanent storage of the movement information.

Different time periods corresponding with movements made by the mobile devices are schematically illustrated in FIGS. 4a-4d. In FIG. 4a, the movements (for example the movements M and M illustrated in FIG. 1) take the same amount of time and start at the same moment, that is, the time intervals T and T' coincide. In FIG. 4b, the movements take the same amount of time (time intervals T and T' have the same length) but start at different points in time. The time interval T and T' overlap as time interval T' starts before time interval T has ended. In this case, it will be necessary to buffer the movement information corresponding with time interval T.

In FIG. 4c, the situation is reversed and time interval T starts later than time interval T', but the time intervals have the same length. In this case, the movement information corresponding with time interval T' will have to be buffered.

In FIG. 4d, time interval T' starts later than time interval T and has a shorter duration. In this case, the movement information corresponding with time interval T will have to be buffered, while the time scale of at least one of the movements will have to be corrected by time compression or time expansion. In the embodiments of FIGS. 3a-3c, either the buffer unit 15 or the comparison unit 13 is preferably configured for time compression and/or expansion using techniques which may be known per se.

It is noted that in the present invention any temporarily stored movement information is produced by a mobile device for comparison with the movement information produced by another mobile device.

A movement and its associated margin of error is illustrated in FIG. 5. Any movements which lie within the interval I may be said to be substantially identical to the movement M. The range of the interval I may be variable and is preferably set by the user and/or the system operator. Typically, the range may be 10% or 20% (when expressed in acceleration values and/or spatial coordinates).

While FIG. 5 shows the case of a (nearly) identical match, other matches are possible and may involve translations, rotations, compressions, expansions and/or other operations prior to the actual matching (in addition to any—optional—buffering). Accordingly, movements may have different orientations and still produce a match.

Any link set up between mobile devices as a result of matching movement may also be terminated by using movements. The termination may again require matching movements, but may also be effected by a predetermined termination movement.

The present invention is based upon the insight that by comparing movement information from two or more mobile devices, similar or related movements of the mobile devices may be identified. The present invention benefits from the further insight that movements need not be predetermined to allow comparison.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

What is claimed is:

1. A method of identifying mobile devices capable of communicating with each other, the method comprising the steps of:
   deriving, for each mobile device, movement information from movements made by the mobile device within a respective time period, and
   communicating the movement information,
   comparing the movement information of the mobile device with the movement information of at least one other mobile device, and
   identifying mobile devices having matching movement information.

2. The method according to claim 1, wherein the step of comparing includes searching for movement information associated with substantially identical movements.

3. The method according to claim 1, wherein the step of comparing includes searching for movement information associated with movements which substantially are each other's mirror images.

4. The method according to claim 1, wherein at least two mobile devices are held together during their movement.

5. The method according to claim 1, wherein the at least one movement is a random movement.

6. The method according to claim 1, wherein the respective time periods are identical.

7. The method according to claim 1, wherein the respective time periods have no overlap.

8. The method according to claim 1, wherein the step of deriving movement information is carried out using sensors mounted in the mobile device, such as acceleration sensors and/or optical sensors.

9. The method according to claim 1, wherein the step of communicating the movement information involves transmitting the movement information to another mobile device and carrying out the step of comparing the movement information in the other mobile device.

10. A computer program product for carrying out the method according to claim 1.

11. A mobile device capable of communicating with other mobile devices, the mobile device comprising:
   movement sensors for deriving movement information from movements made by the mobile device within a respective time period, and
   a communication unit for communicating the movement information,
   a comparison unit for comparing the movement information of the mobile device with the movement information of at least one other mobile device, and
   an identification unit for identifying mobile devices having matching movement information.

12. The device according to claim 11, further comprising a buffer unit for temporarily storing movement information.

13. The device according to claim 11, wherein the movement sensors are selected from the group consisting of acceleration sensors and optical sensors.

14. A system for mobile communication, the system comprising a mobile device according to claim 11.

15. An identification server for use in the method according to claim 1.

16. An identification server for use in the system according to claim 14.

* * * * *

UNITED STATES PATENT AND TRADEMARK OFFICE
CERTIFICATE OF CORRECTION

PATENT NO. : 8,433,537 B2
APPLICATION NO. : 12/676714
DATED : April 30, 2013
INVENTOR(S) : Berco Beute It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
Eighth Day of September, 2015

Michelle K. Lee
*Director of the United States Patent and Trademark Office*